(12) United States Patent
Philips et al.

(10) Patent No.: US 6,932,012 B1
(45) Date of Patent: Aug. 23, 2005

(54) MULTI-HULL SURFACE VESSEL WITH DRAG REDUCTION ON LATERAL HULLS

(76) Inventors: Richard B. Philips, 30 Walnut Rd., Barrington, RI (US) 02806; Robert Latorre, 420 Old Hammond Metairie Rd., Metairie, LA (US) 70005

( * ) Notice: Subject to any disclaimer, the term of this patent is extended or adjusted under 35 U.S.C. 154(b) by 10 days.

(21) Appl. No.: 10/774,642

(22) Filed: Feb. 9, 2004

(51) Int. Cl.[7] .................................................. B63B 1/34
(52) U.S. Cl. .................................... 114/67 A; 114/61.1
(58) Field of Search ......................... 114/61.1, 67 A, 114/288, 289, 290, 67 R, 274; 244/207, 208

(56) References Cited

U.S. PATENT DOCUMENTS

| | | | |
|---|---|---|---|
| 3,191,572 A * | 6/1965 | Wilson | 114/67 A |
| 4,031,841 A * | 6/1977 | Bredt | 114/67 A |
| 4,393,802 A * | 7/1983 | Rizzo | 114/67 A |
| 5,117,882 A | 6/1992 | Stanford | |
| 5,524,568 A | 6/1996 | Bobst | |
| 5,722,341 A | 3/1998 | Tornqvist | |
| 5,803,410 A * | 9/1998 | Hwang | 244/208 |
| 5,967,071 A | 10/1999 | Wipper | |
| 6,092,480 A * | 7/2000 | Takahashi et al. | 114/67 A |
| 6,145,459 A * | 11/2000 | Takahashi et al. | 114/67 A |
| 6,356,816 B1 * | 3/2002 | Katz | 114/67 A |

* cited by examiner

Primary Examiner—Lars A. Olson
(74) Attorney, Agent, or Firm—Michael P. Stanley; James M. Kasischke; Jean-Paul A. Nasser

(57) ABSTRACT

A marine surface vessel having a main hull and at least two lateral hulls disposed respectively on opposite sides of the main hull. The vessel includes an engine disposed in the main hull producing exhaust gas and cooling air, microbubble injectors disposed in subsurface areas of each of the lateral hulls, and conduits in fluid communication with the microbubble injectors. Upon operation of the engine, the exhaust and/or cooling air produced by the engine is directed by the conduits to the injectors to effect generation of microbubbles on the subsurface areas of the lateral hulls to occasion microbubble drag reduction on the lateral hulls.

5 Claims, 3 Drawing Sheets

MULTI-HULL SURFACE VESSEL WITH DRAG REDUCTION ON LATERAL HULLS

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention relates to reduction of drag, and its attendant advantages for marine surface vessels, and is directed more particularly to the reduction of drag caused by additional hulls in multi-hull vessels, such as trimarans and pentamarans.

(2) Description of the Prior Art

Multi-hull surface vessels, such as trimarans and pentamarans, are used for civilian and military applications. A multi-hull design provides the advantages of vessel stability at high speeds and increased deck space. In a typical trimaran, the multi-hulls or lateral hulls are substantially smaller than the main hull and have a substantially smaller subsurface area.

While a multi-hull vessel offers the advantages set forth above, the presence of a plurality of hulls increases the drag forces of the vessel, thereby requiring more power to gain the high speeds desired.

The theoretical advantages of encompassing a hull with microbubbles to reduce drag are known and have been realized in laboratories with model ships operating at modest speeds. However, the use of microbubbles with full-sized vessels has generally been unsuccessful because the air/gas flow required for encompassing the sides of full-sized hulls is too large. A large air/gas flow requires large air/gas compressors, or the like. Further, the presence of microbubbles reduces the effectiveness of exterior propulsion units, such as the vessel's propellers.

As such, there is a need to eliminate the increased drag of a multi-hull vessel, preferably through efficient microbubble generation, so that the advantages of such vessels may be exploited to a greater degree.

SUMMARY OF THE INVENTION

Accordingly, it is a general purpose and primary object of the present invention to provide a multi-hull vessel in which the drag of the lateral hulls of the vessel is reduced, thereby reducing the overall drag of the vessel.

It is a further object of the present invention to accomplish drag reduction of the lateral hulls by utilization of microbubbles without a need for compressors on board, and without affecting propeller efficiency.

With the above and other objects in view, as will hereinafter appear, there is provided a marine surface vessel having a main hull and at least two lateral hulls disposed respectively on opposite sides of the main hull. The vessel is provided with a gas turbine engine disposed in the main hull and adapted in operation to drive the propellers and, in addition, to produce exhaust gas and cooling air, microbubble injectors disposed in subsurface areas of each of the lateral hulls, and conduits placing at least one of the exhaust gas and cooling air discharges in communication with the microbubble injectors. During operation of the gas turbine engine, the gas turbine exhaust and/or cooling air is directed by the conduits to the microbubble injectors to effect generation of microbubbles on the subsurface areas of the lateral hulls to occasion microbubble drag reduction on the lateral hulls.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the several views of the drawings and wherein.

DESCRIPTION OF THE PREFERRED EMBODIMENT

It has been found that the application of microbubble drag reduction is rendered attractive in multi-hull vessels in view of the underwater area of lateral hulls, that is, the hulls outboard of the main hull. A microbubble system used only on lateral hulls, which are not provided with propellers, avoids the issues associated with the negative impact of microbubble systems on the performance of propulsion propellers.

It will be apparent that the above description pertaining to a trimaran vessel applies equally to a pentamaran vessel, or other multi-hull type of surface vessel.

Figure 1:
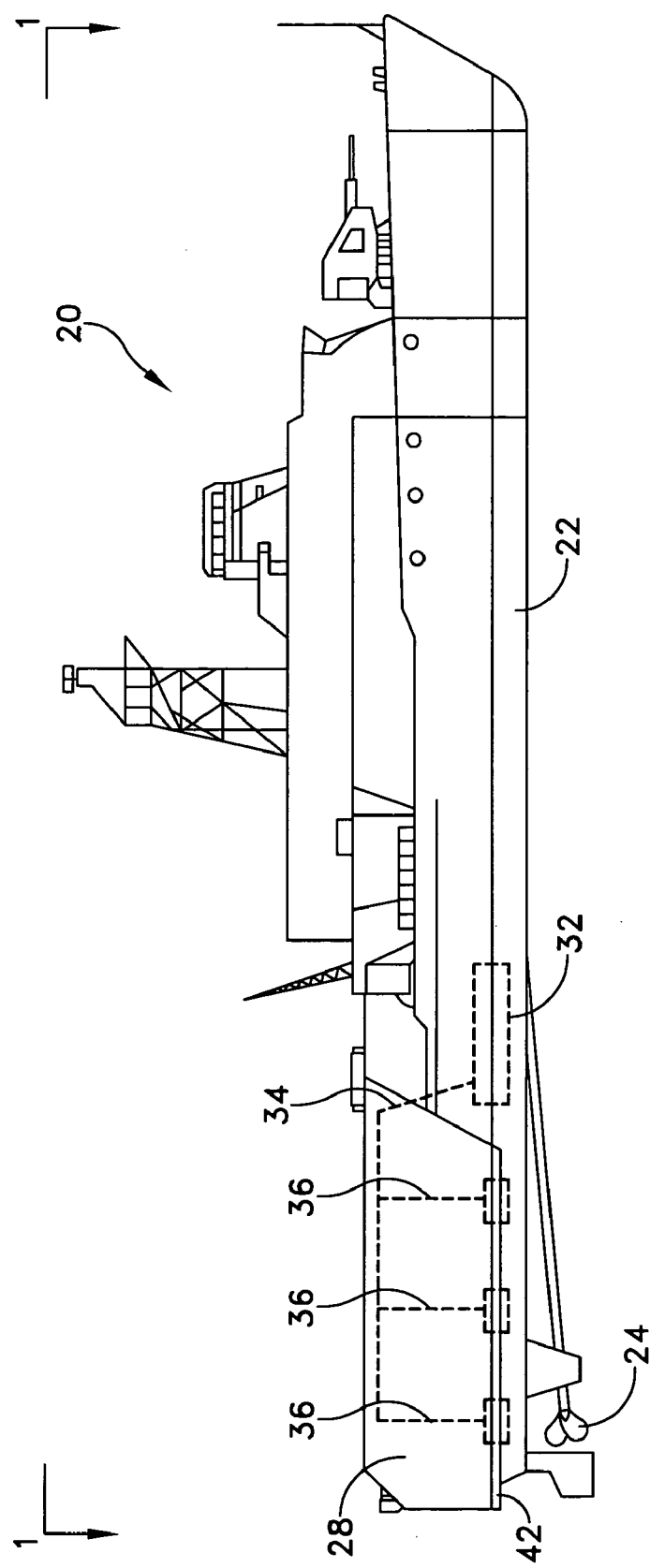
FIG. 1 is a side view of one form of multi-hull vessel illustrative of an embodiment of the present invention.
Figure 2:
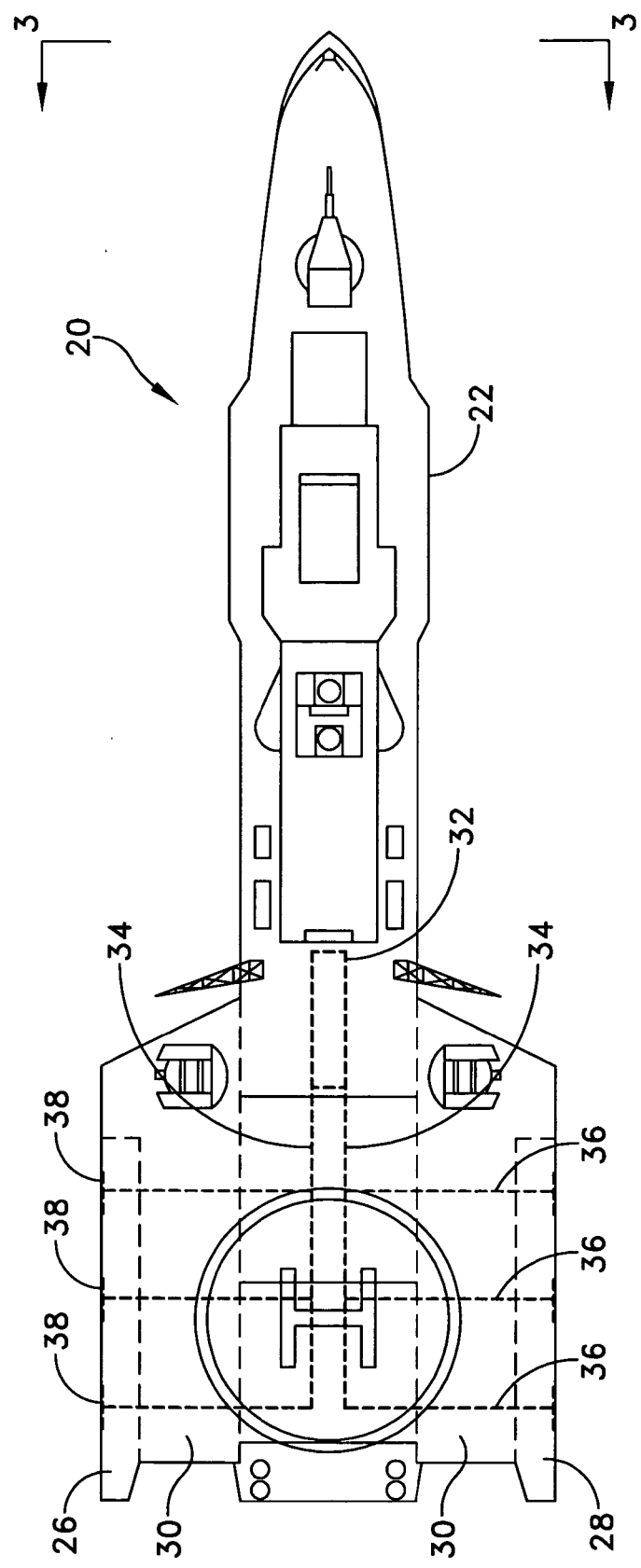
FIG. 2 is a top view of the vessel illustrative of the embodiment of the present invention with the view taken from reference line 2—2 of FIG. 1.
Figure 3:
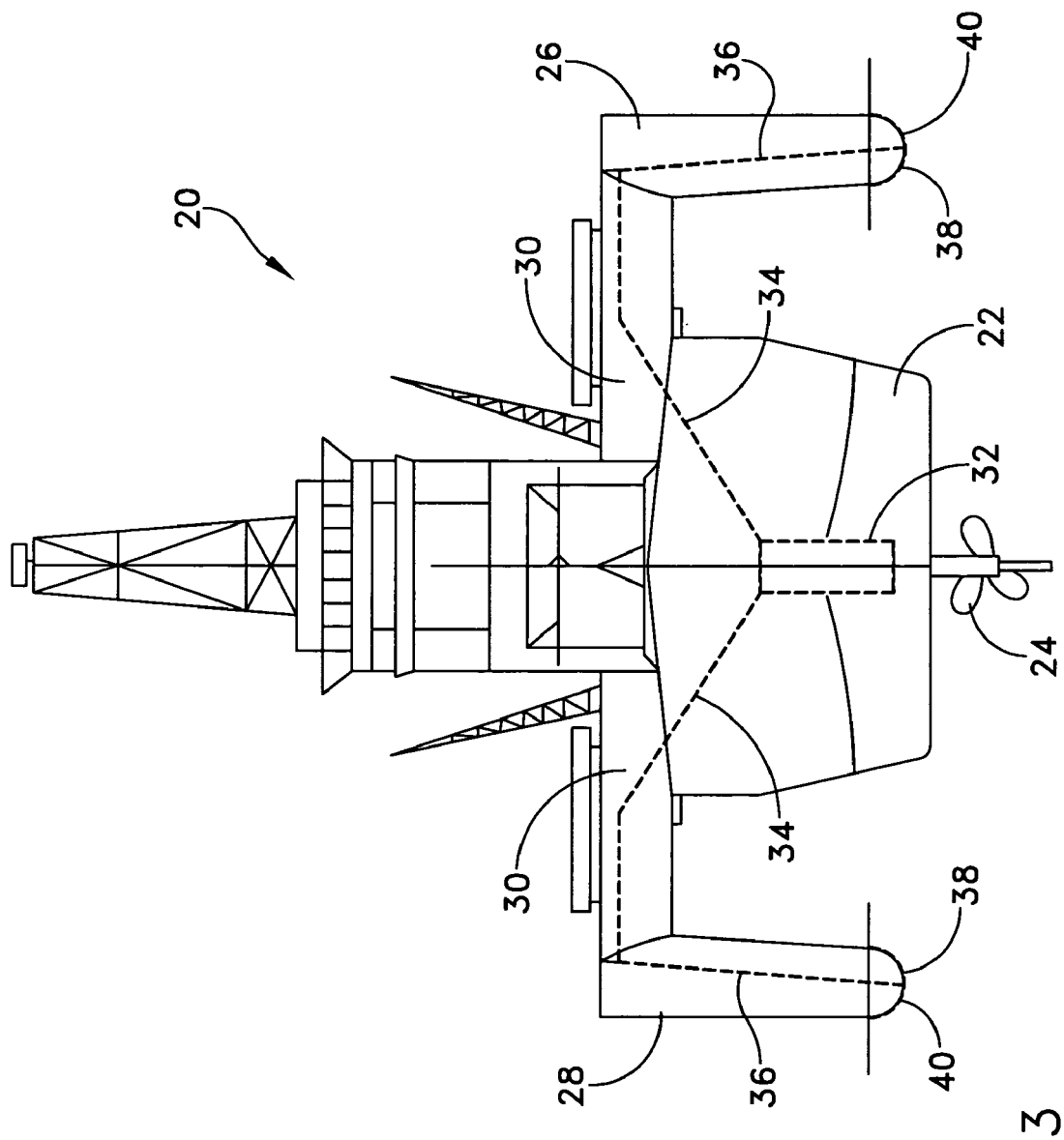
FIG. 3 is a front view of the vessel illustrative of the embodiment of the present invention with the view taken from reference line 3—3 of FIG. 2.

Referring now to FIGS. 1–3 wherein like numerals refer to like elements throughout the several views, it will be seen that a traditional trimaran 20 is provided with a main hull 22 on which is mounted at least one propulsion propeller 24, and outboard of the main hull a first lateral hull 26 to port of the main hull 22, and a second lateral hull 28 to starboard of the main hull 22. An athwartship extending deck structure 30 is supported by all three hulls 22, 26, 28.

The vessel 20 is powered by a gas turbine engine 32 which produces exhaust gas and cooling gas through discharge lines 34; however alternative gas-producing power generators may be used in lieu of the gas turbine engine 32.

The discharge lines 34 convey gas to distribution lines 36, each of which extends to a microbubble injector 38 located in an outside area but preferably a subsurface area 40 of one of the lateral hulls 26, 28. The subsurface area 40 is defined as the area of the lateral hulls 26 normally under the surface of the water.

The microbubble injectors 38 typically are strips or plates of porous material, typically in the range of 40%–50% open area defined by holes in the range of $\frac{1}{16}$ to $\frac{1}{8}$ inch. The plates preferably are disposed every twenty feet, or so, along the subsurface area of the lateral hulls. The microbubble injectors 38 may extend completely around the bottom of the lateral hulls 26 and 28, as shown in FIG. 3.

The microbubbles are generated by either, or both, of the gas turbine exhaust gas and cooling air, both of which are otherwise vented to the atmosphere and/or underwater.

Surface effect ships (SES) are surface vessels provided with an air cushion capability. Such ships ride on an air cushion, at least in part. Such vessels, in operation, experience relatively low surface area in contact with the water. Thus, a multi-hull SES presents even less of a subsurface area than a regular multi-hull vessel.

To improve performance in either an SES or non-SES type vessel, a non-wetting hull coating (teflon, silicon, or the like) may be applied to the surface areas of the hull of the SES.

There is thus provided a multi-hull vessel in which the drag of the lateral hulls is reduced, thereby reducing the overall drag of the vessel, and permitting increased speed and reduced fuel requirements. The drag reduction is accomplished without affecting the efficiency of the propulsion propellers mounted on the main hull.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A multi-hull vessel, said vessel comprising:
   a main hull;
   at least two lateral hulls disposed on opposite sides of said main hull with a surface deck disposed therebetween;
   an engine mounted in said main hull, said engine being capable of producing exhaust;
   a plurality of microbubble injectors disposed in exterior areas of each of said lateral hulls in which said microbubble injectors are limited to the subsurface areas of said lateral hulls, extend around the bottoms of said lateral hulls and are spaced along inboard and outboard sides of said lateral hulls wherein each of said microbubble injectors comprises a plate having an open area in the range of 40–50%, the open area defined by a multiplicity of apertures in the range of $1/16$–$1/8$ inch diameter; and
   a plurality of conduits in fluid communication with said engine and microbubble injectors;
   wherein said engine is capable of producing cooling air with said conduits directing the cooling air to said microbubble injectors thereby effecting microbubble generation on the exterior areas and whereby upon an operation of said engine, exhaust produced by said engine is directed by said conduits to said microbubble injectors thereby effecting generation of microbubbles on the exterior areas to occasion microbubble drag reduction on said lateral hulls.

2. The multi-hull vessel in accordance with claim 1 wherein the subsurface areas of said lateral hulls are provided with a non-wetting hull coating.

3. A multi-hull vessel said vessel comprising:
   a main hull;
   at least two lateral hulls disposed on opposite sides of said main hull with a surface deck disposed therebetween;
   an engine mounted in said main hull, said engine being capable of producing exhaust;
   a plurality of microbubble injectors disposed in exterior areas of each of said lateral hulls in which said microbubble injectors are limited to the subsurface areas of said lateral hulls, are spaced along one side of each of said lateral hulls and extend around the bottoms of said lateral hulls wherein each of said microbubble injectors comprises a plate having an open area in the range of 40–50%, said open area defined by a multiplicity of apertures in the range of $1/16$–$1/8$ inch diameter; and
   a plurality of conduits in fluid communication with said engine and microbubble injectors;
   wherein said engine is capable of producing cooling air with said conduits directing the cooling air to said microbubble injectors thereby effecting microbubble generation on the exterior areas and whereby upon an operation of said engine, exhaust produced by said engine is directed by said conduits to said microbubble injectors thereby effecting generation of microbubbles on the exterior areas to occasion microbubble drag reduction on said lateral hulls.

4. A multi-hull vessel, said vessel comprising:
   a main hull;
   at least two lateral hulls disposed on opposite sides of said main hull with a surface deck disposed therebetween;
   an engine mounted in said main hull, said engine being capable of producing exhaust;
   a plurality of microbubble injectors disposed in exterior areas of each of said lateral hulls wherein each of said microbubble injectors comprises a plate having an open area in the range of 40–50%, said open area defined by a multiplicity of apertures in the range of $1/16$–$1/8$ inch diameter; and
   a plurality of conduits in fluid communication with said engine and microbubble injectors;
   wherein said engine is capable of producing cooling air with said conduits directing the cooling air to said microbubble injectors thereby effecting microbubble generation on the exterior areas and whereby upon an operation of said engine, exhaust produced by said engine is directed by said conduits to said microbubble injectors thereby effecting generation of microbubbles on the exterior areas to occasion microbubble drag reduction on said lateral hulls.

5. The multi-hull vessel in accordance with claim 4 wherein the subsurface areas of said lateral hulls are provided with a non-wetting hull coating.

\* \* \* \* \*